(No Model.)
G. L. GERHARD.
HAND SEED SOWER.
No. 589,386.                    Patented Aug. 31, 1897.
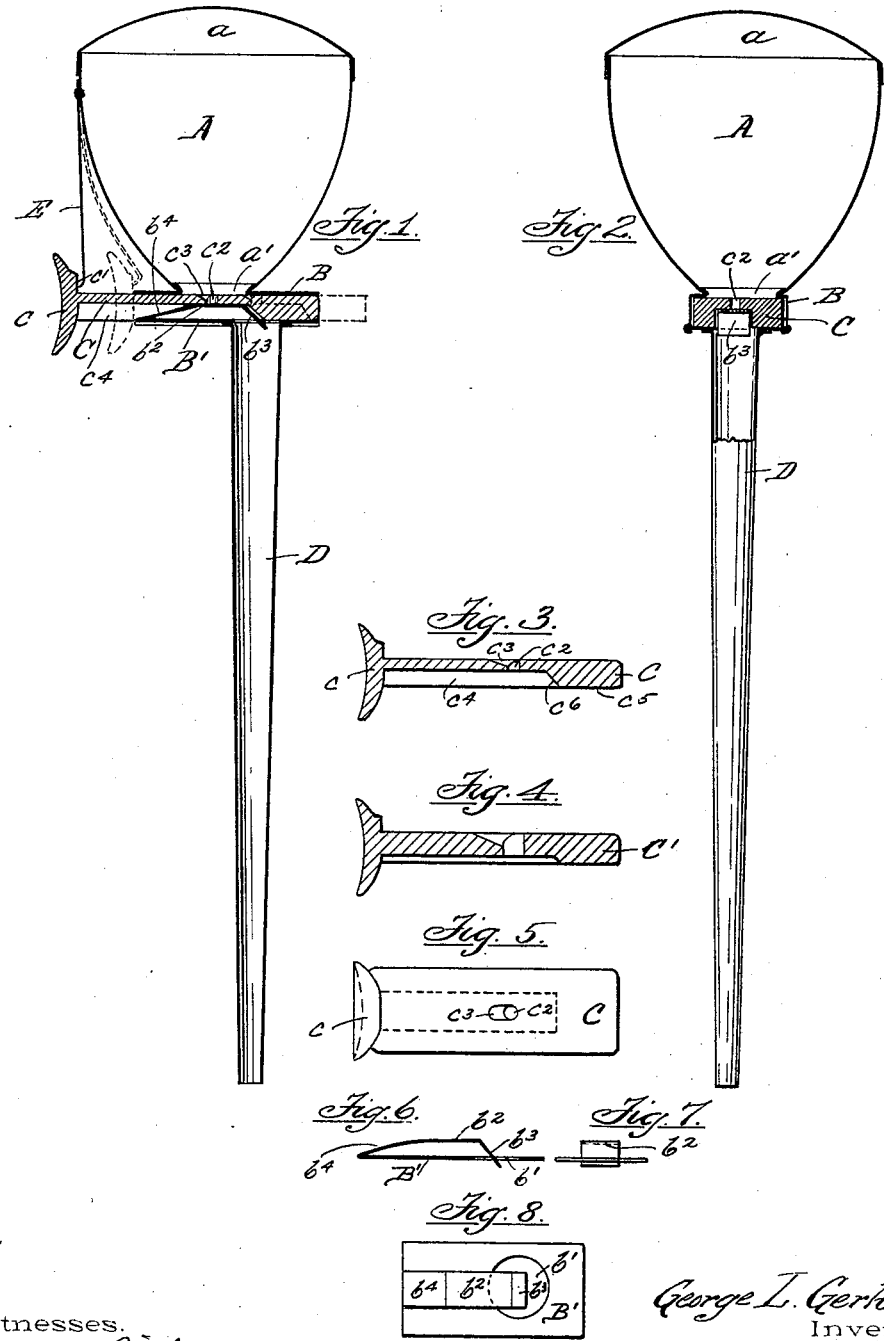
Witnesses.
Caleb J. Rieber
Rowley A. Stewart
George L. Gerhard
Inventor.
by
Attorney.

# UNITED STATES PATENT OFFICE.

GEORGE L. GERHARD, OF READING, PENNSYLVANIA, ASSIGNOR OF ONE-HALF TO CHARLES J. DWIGHT, OF SAME PLACE.

HAND SEED-SOWER.

SPECIFICATION forming part of Letters Patent No. 589,386, dated August 31, 1897.

Application filed April 6, 1897. Serial No. 630,912. (No model.)

*To all whom it may concern:*

Be it known that I, GEORGE L. GERHARD, a citizen of the United States, residing at Reading, county of Berks, State of Pennsylvania, have invented certain Improvements in Hand Seed-Sowers, of which the following is a specification.

My invention relates particularly to that class of seed-sowers in which the device is held in the hand of the operator, who also manipulates directly a valve whereby the flow of seed from the hopper to the ground is controlled.

My general object is to provide a seed-sower of this kind which will be simple, neat, and inexpensive in construction and easy and satisfactory in operation, which may be readily adapted to various sizes and shapes of seeds, and which will provide a uniform feed for each movement of the valve and avoid any mutilation of the seeds.

The novel features of the invention are fully described in connection with the accompanying drawings and are specifically pointed out in the claims.

Figure 1 is a vertical longitudinal section of my improved hand-seed sower. Fig. 2 is a vertical transverse section of the same. Fig. 3 is a separate view of the valve in longitudinal section, and Fig. 4 is a similar view of a substitute valve adapted for seed of larger size. Fig. 5 is a top view of the valve. Figs. 6, 7, and 8 show in detail the construction of the valve-seat, as shown in Figs. 1 and 2.

The seed receptacle or hopper A, with its cover $a$, is preferably approximately hemispherical in shape, as shown, so as to be conveniently grasped by the hand of the operator in a manner similar to the grasping of the knob of a door, leaving the thumb or finger free to operate the valve. The lower small end of the hopper has an opening $a'$, which communicates with a similar opening in the top plate of a valve-casing B, to which the hopper is suitably secured. This valve casing or way is completed by a bottom plate B', which has an opening $b'$ in communication with a discharge spout or tube D, of convenient length to convey the freed seeds to the ground. The bottom plate B' carries on its upper face a raised valve-seat $b^2$, formed of spring metal, the free end of which is bent downward at an obtuse angle into the opening $b'$, as indicated at $b^3$, while the opposite end is also inclined, as shown at $b^4$, the purpose of these inclines being to facilitate the insertion and removal of the valves, as will be hereinafter explained.

The valve C, which is preferably made of cast metal, is adapted to fit loosely in the valveway formed by the casing B B'. Its thickness is in the main sufficient to loosely occupy the whole space allowed between the top and bottom plates of the casing, which space is more than equal to the diameter of the largest seed that the sower is adapted for. It is, however, reduced in thickness to a greater or less extent than in different valves by a narrow longitudinal recess $c^4$ in its bottom face, which recess is adapted to receive the normally-raised spring valve-seat $b^2$. This reduced portion of the valve is provided with a perforation $c^2$ of a diameter adapted to the particular kind of seed which the valve is intended for. To this perforation I give a peculiar shape by chamfering off the top edge metal at one portion of the hole, so as to form an extension $c^3$ of the feed-opening in a direction opposite to the motion of the valve in opening the latter, the effect of which I will hereinafter refer to.

The front end of the valve is formed with a suitable head or button $c$, to the rear of which is formed a shoulder $c'$ at right angles to the plane of movement of the valve, against which presses the free end of a spring E, the opposite end of which is attached to the hopper. This spring tends to force the valve outward to the position shown in Fig. 1.

As already stated, one object of my invention is to enable the same device to be used for different kinds and sizes of seeds. This I accomplish by providing a series of two or more valves which differ only in the depth of the recess $c^4$ and in the size of the feed-opening $c^2$ $c^3$ therein.

In order to remove the valve shown in Fig. 2, it is only necessary to pull it outward with sufficient force, the beveled shoulder $c^6$ of the recess $c^4$ in the valve bearing against the end $b^3$ of the spring valve-seat, which end ordinarily forms a stop for the valve and serving to depress the latter so as to permit the withdrawal of the valve. In a similar way the valve to be substituted is inserted, the spring valve-seat being again depressed until the thick part of the valve $c^5$ has passed it, when it rises into the recess $c^4$ and supports the seeds which enter the feed-opening in the valve.

The seed or seeds, as the case may be, which thus enter the feed-opening are carried with the latter as it is moved inward to the position indicated by dotted lines. The length of the valve-casing is sufficient to prevent the escape of any seed when the valve is moved inward to the full extent, which movement, as shown, is limited by the button or head $c$ coming in contact with the casing. As the seeds are carried past the edge of the hole $a'$ in the hopper any seed which has only partly entered the feed-opening will be pushed up the inclined extension $c^3$, formed by the chamfered edge, thus escaping any injury, instead of being cut or crushed, as will occur when this extension $c^3$ is not provided. As the feed-opening passes the bent end $b^3$ of the valve-seat the seed is released and drops into and through the discharge-spout D to the ground. The fact that the end $b^3$ of the valve-seat plate extends downward into the mouth of the discharge spout or tube, as described, insures the delivery of the seed into the tube, and the latter is controlled by the other hand of the operator, so as to direct the seeds to the required point on the ground.

What I claim is—

1. A seed-sower comprising a hopper, a discharge spout or tube, an intervening valve-casing having a raised valve-seat therein, and a reciprocating feed-valve riding above said raised seat and having a perforation to receive the seeds, which perforation is normally closed by said raised valve-seat, substantially as set forth.

2. A seed-sower comprising a hopper, a discharge spout or tube, an intervening valve-casing having a yielding valve-seat therein and a reciprocating feed-valve riding above said yielding seat, substantially as set forth.

3. A seed-sower comprising a hopper, a discharge spout or tube, an intervening valve-casing having a yielding valve-seat therein with downwardly-inclined end, and a reciprocating feed-valve riding above said yielding seat and having a recess to engage the same provided with a shoulder adapted to contact with the wedge-shaped end of the yielding valve-seat substantially as set forth.

4. In a seed-sower the combination with the hopper and discharge-spout, of an intervening valve-casing provided with a yielding valve-seat adapting the same for the reception of reciprocating valves of varying thickness substantially as and for the purpose set forth.

5. A hand seed-sower comprising a hopper forming a knob-like handle, a discharge-spout communicating therewith, and a feed-valve between the same provided with a spring adapted to normally close it against a stop and a button conveniently placed for the hand of the operator substantially as set forth.

6. A seed-sower comprising a hopper, a discharge spout or tube, an intervening valve-casing having a yielding valve-seat therein the intermediate portion of which is normally raised above the bottom of the casing and the front and rear thereof inclined downward, and a reciprocating feed-valve adapted to ride upon or forcibly depress said seat, substantially as set forth.

In testimony whereof I affix my signature in presence of two witnesses.

GEORGE L. GERHARD.

Witnesses:
CHARLES J. DWIGHT,
ADAM L. OTTERBEIN.